(12) United States Patent
Yamanaka et al.

(10) Patent No.: US 8,905,256 B2
(45) Date of Patent: Dec. 9, 2014

(54) RESIN-COATED METAL SHEET

(75) Inventors: Yoichiro Yamanaka, Hiroshima (JP);
Junichi Kitagawa, Kanagawa (JP);
Yoshihiko Yasue, Hiroshima (JP);
Yasuhide Oshima, Hiroshima (JP);
Hiroshi Kubo, Hiroshima (JP); Hiroki Iwasa, Hiroshima (JP); Shinsuke Watanabe, Hiroshima (JP); Katsunori Nakai, Hiroshima (JP)

(73) Assignee: JFE Steel Corporation, Tokyo (JP)

( * ) Notice: Subject to any disclaimer, the term of this patent is extended or adjusted under 35 U.S.C. 154(b) by 1033 days.

(21) Appl. No.: 11/919,682

(22) PCT Filed: Jul. 26, 2006

(86) PCT No.: PCT/JP2006/315242
§ 371 (c)(1),
(2), (4) Date: Oct. 31, 2007

(87) PCT Pub. No.: WO2007/013657
PCT Pub. Date: Feb. 1, 2007

(65) Prior Publication Data
US 2009/0068481 A1 Mar. 12, 2009

(30) Foreign Application Priority Data
Jul. 28, 2005 (JP) ................. 2005-219004

(51) Int. Cl.
*B65D 1/40* (2006.01)
*B32B 1/08* (2006.01)
*B32B 7/02* (2006.01)
*B32B 15/08* (2006.01)
*B32B 27/36* (2006.01)

(52) U.S. Cl.
CPC ............... *B32B 15/08* (2013.01); *B32B 27/36* (2013.01)
USPC ................ 220/62.13; 220/62.22; 428/35.9; 428/212; 428/458

(58) Field of Classification Search
USPC ............. 428/458, 461, 35.9, 212; 220/62.22, 220/62.13
See application file for complete search history.

(56) References Cited

U.S. PATENT DOCUMENTS 3,875,118 A * 4/1975 Meisert et al. ................. 528/64
4,514,315 A * 4/1985 Matulewicz et al. ........... 252/75
5,137,762 A * 8/1992 Aizawa et al. ............... 428/35.8

(Continued)

FOREIGN PATENT DOCUMENTS

EP 0807517 A2 4/1997
EP 0987100 A2 3/2000

(Continued)

OTHER PUBLICATIONS

Supplementary European Search Report mailed Apr. 26, 2012 for EP 06782119.

*Primary Examiner* — Kevin R Kruer
(74) *Attorney, Agent, or Firm* — Holtz, Holtz, Goodman & Chick PC

(57) ABSTRACT

A resin-coated metal sheet includes resin layers formed on both surfaces thereof and composed of a polyester as a main component, wherein the resin layer covering the inner surface of a container after the formation thereof has an interfacial free energy with water of 30 mN/m or more. The container formed from the resin-coated metal sheet exhibits an excellent content release property for contents with a high protein content.

8 Claims, 1 Drawing Sheet

(56) References Cited

U.S. PATENT DOCUMENTS

| | | | |
|---|---|---|---|
| 5,858,551 A * | 1/1999 | Salsman | 428/480 |
| 6,417,294 B1 * | 7/2002 | Obuchi et al. | 525/450 |
| 6,565,937 B2 * | 5/2003 | Sato et al. | 428/35.9 |
| 6,835,765 B1 * | 12/2004 | Milan | 524/238 |
| 7,198,856 B2 * | 4/2007 | Yamanaka et al. | 428/458 |
| 2002/0188092 A1 * | 12/2002 | Moskala et al. | 528/272 |
| 2003/0049474 A1 * | 3/2003 | Su et al. | 428/515 |
| 2003/0217824 A1 * | 11/2003 | Bottorff | 162/158 |
| 2004/0101698 A1 | 5/2004 | Yamanaka et al. | |
| 2004/0219316 A1 | 11/2004 | Takahashi | |
| 2005/0260417 A1 * | 11/2005 | Yamanaka et al. | 428/425.8 |

FOREIGN PATENT DOCUMENTS

| | | |
|---|---|---|
| EP | 1149772 A1 | 10/2001 |
| EP | 1270201 A2 | 1/2003 |
| EP | 1380413 A1 | 1/2004 |
| JP | 2001-328204 A | 11/2001 |
| JP | 2004-188622 A | 7/2004 |
| JP | 2004-203905 A | 7/2004 |
| JP | 2005-048043 A | 2/2005 |
| JP | 2005-161707 * | 6/2005 |

* cited by examiner

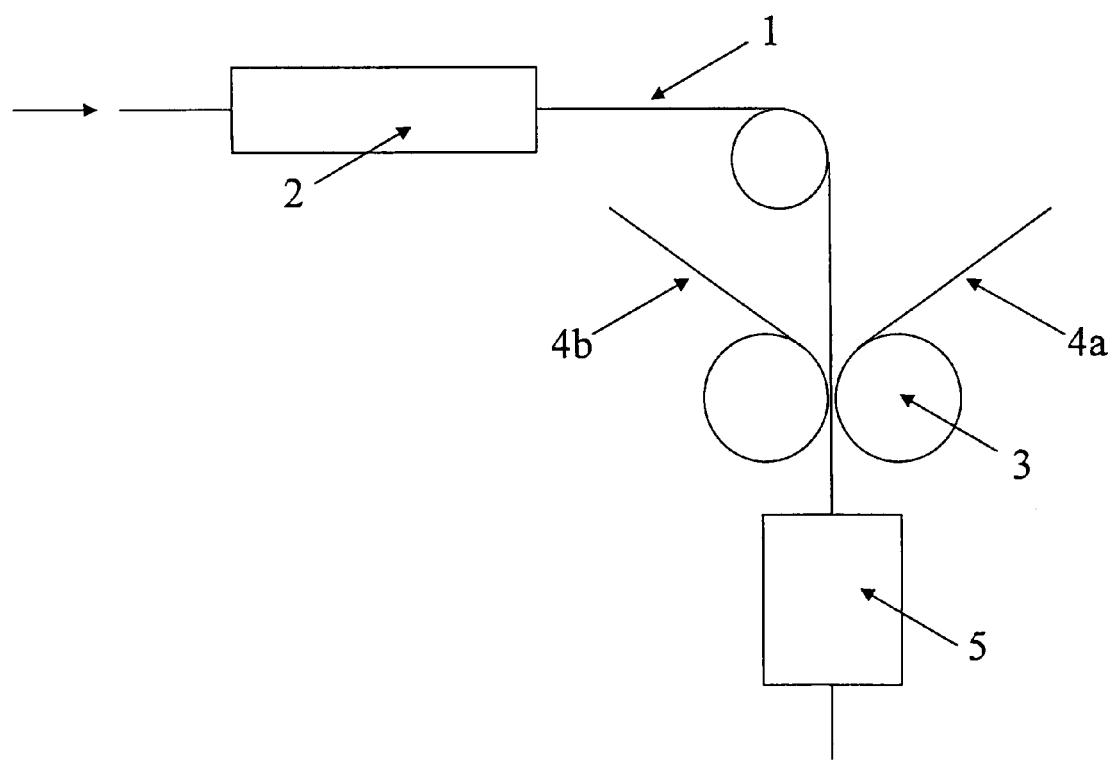

US 8,905,256 B2

RESIN-COATED METAL SHEET

This application is the United States national phase application of International Application PCT/JP2006/315242 filed Jul. 26, 2006.

TECHNICAL FIELD

The present invention relates to a resin-coated metal sheet used for can bodies and covers of food cans.

BACKGROUND ART

In general, metal sheets of tin-free steel (TFS) and aluminum used for food cans are painted. The painting method has the problem of complicating a baking step, requiring much treatment time, and discharging a large amount of solvent. In order to resolve the problem, resin-coated metal sheets including thermoplastic resin films fused to the metal sheets under heating have been developed and now industrially used mainly as raw materials for beverage cans.

However, when a general resin-coated metal sheet is used for food cans, there occurs the problem that the contents strongly adhere to the inner surface of a vessel and thus cannot be easily taken out. This problem is closely related to consumer eagerness to buy and is thus a very important problem in maintaining consumer eagerness to buy. However, for conventional resin-coated metal sheets for containers, there are very few investigations of improvement in the ease of release of contents.

In Japanese Unexamined Patent Application Publication No. 2001-328204, the inventors have previously proposed, as a measure for improving the content release property, a metal plate laminated with a polyester resin containing specified wax.

This technique can secure a high property for high-fat contents with low adhesiveness, such as meat, eggs, hydrocarbon, or mixtures thereof, and can produce a certain result.

However, for contents with a high protein content, such as luncheon meat and tuna, the excellent content release property cannot be sufficiently secured because of high adhesiveness.

The present invention has been achieved for solving the above-mentioned problem, and an object of the present invention is to provide a resin-coated metal sheet for containers which has the excellent release property for contents with a high protein content.

DISCLOSURE OF INVENTION

The present invention provides a resin-coated, metal sheet including resin layers composed of a polyester as a main component and formed on both surfaces thereof, the resin layer covering the inner surface of a container after the formation thereof having an interfacial free energy of 30 mN/m or more with water. The resin-coated metal sheet preferably includes another polyester resin layer formed between the metal sheet and each of the resin layers composed of polyester as the main component.

In the resin-coated metal sheet, the resin layers composed of polyester as the main component preferably contain 0.5 to 40 mass % of a fatty acid amide. The fatty acid amide is preferably ethylene bis-stearic acid amide.

In the resin-coated metal sheet, the resin covering the outer surface of a container after the formation thereof preferably has a surface free energy of 25 mN/m or more.

The present invention also provides a resin-coated metal sheet having the excellent content release property and including resin layers composed of a polyether as main component and formed on both surfaces, wherein the surface of the resin layer to be positioned on the inner surface of a container after the formation thereof has an interfacial free energy with water of 30 mN/m or more.

BRIEF DESCRIPTION OF THE DRAWINGS

FIG. 1 is a drawing showing a principal portion of an apparatus for laminating a metal sheet (Example 1).

BEST MODE FOR CARRYING OUT THE INVENTION

The present invention will be described in detail below.

First, as a metal sheet used in the present invention, an aluminum sheet and a soft steel sheet which are widely used as can materials can be used. In particular, a surface-treated steel sheet (so-called TFS) having a two-layer film including a lower chromium metal layer and an upper chromium hydroxide layer is optimum.

The deposits of the chromium metal layer and the chromium hydroxide layer of TFS are not particularly limited. However, from the viewpoint of adhesiveness and corrosion resistance after processing, the deposits of the chromium metal layer and the chromium hydroxide layer are preferably in the ranges of 70 to 200 mg/m$^2$ and 10 to 30 mg/m$^2$, respectively, in terms of Cr.

In the present invention, both surfaces of the metal sheet are coated with a resin to form a resin-coated metal sheet. The coating resin will be described in detail later.

Further, after the resin-coated metal sheet is formed in a container, the interfacial free energy with water of the resin layer surface to be positioned on the inner surface of the container is specified to 30 mN/m or more. This specification is the most important requirement of the present invention and can secure the excellent release property for contents such as luncheon meat and tuna. Although the detailed mechanism of this phenomenon is unknown, the following mechanism can be estimated.

Since a protein has many polar groups, hydrogen bonds to a rein easily occur and the adhesion of lipid also occurs starting from the protein adhering to the resin surface, thereby causing strong adhesiveness.

When the interfacial free energy with water of the surface of a resin layer is increased to a predetermined value or more, an oil film (thin film of oil) can be stably present at the interface between contents and the resin layer.

When the interfacial free energy is controlled in the range of 30 mN/m or more, the excellent release property can be obtained for not only protein-rich contents, such as luncheon meat, but also other contents. Although the detailed reason for this is not known, this is possibly due to the fact that fat as a component of contents forms an oil film at the interface between the resin layer and the contents.

In order to the further excellent content release property, the interfacial free energy with water is preferably 40 mN/m or more and more preferably 45 mN/m or more.

A protein in contents is thermally denatured by retort treatment. The retort treatment is a heat treatment of a can filled with contents with a high-temperature steam in order to sterilize the contents. In the thermally denatured protein, the high-order structure is destroyed to change the configuration of hydrophilic groups and hydrophobic groups in its molecule, and the hydrophilic groups are mostly distributed on the surface of the protein. Therefore, a protein after retort treatment is in a state in which it more easily adheres to a resin surface composed of polyester as a main component. Thus, it is necessary that the inner-side resin surface composed of polyester as the main component specified in the present invention maintains the interfacial free energy after the retort treatment.

In the resin-coated metal sheet of the present invention, the interfacial free energy with water of the surface of the resin layer immediately after the formation of the resin layer on the metal sheet may be less than 30 mN/m as long as the interfacial free energy of the resin on the inner surface of a container after the formation thereof is 30 mN/m or more. For example, even when the interfacial free energy is changed by surface modification due to heating in printing or retort treatment, the excellent content release property is exhibited as long as the resin layer is within the range specified in the present invention.

A technique for controlling the interfacial free energy with water of the resin layer composed of polyester as the main component to 30 mN/m or more, a technique of introducing hydrophobic groups (referred to as "lipophilic groups") such as —CH groups into the surface of the resin layer is preferred. In particular, it is effective to add a fatty acid amide with a long chain structure to a polyester resin. Since a fatty acid amide is arranged so that a hydrophobic group is directed to air, the surface of polyester resin is enriched with hydrophobic groups, and hydrophilic groups are directed to the inside of the polyester resin.

As a result, the surface of the polyester resin is hydrophobized (lipophilized) and hydrophobic groups are fixed to the resin surface. Thus, it can be expected to stably maintain the excellent interfacial free energy with water.

The fatty acid amide preferably has a melting point of 120° C. or more and more preferably 130° C. or more. Therefore, the fatty acid amide can be present on the surface of the polyester resin even in retort sterilization for a long time.

Examples of such a fatty acid amide include palmitic acid amide, stearic acid amide, oleic acid amide, linoleic acid amide, and linolenic acid amide, alkylene bis-derivatives thereof. Among alkylene bis-fatty acid amides, ethylene bis-stearic acid amide is particularly preferred in view of heat resistance and food safety.

The amount of the ethylene bis-stearic acid amide added in the present invention is 0.5 to 40 mass %, preferably 5 to 30 mass %, and more preferably 10 to 25 mass % relative to 100 parts by weight of the resin layer composed of polyester as the main component. When the amount of the ethylene bis-stearic acid amide added is 0.5 mass % or more, the presence density of hydrophobic groups in the surface of the resin layer is sufficient, and thus the intended interfacial free energy with water can be obtained. On the other hand, the amount of 40 mass % or less is advantageous for fixing the ethylene bis-stearic acid amide on the surface of the polyester resin. When the ethylene bis-stearic acid amide is fixed on the surface, the following transfer preventing effect can be expected.

Since the resin-coated metal sheet of the present invention is transported and stored in a coiled form, the resin surfaces to be positioned on the inner surface and the outer surface of a container after the formation thereof are compressed over a long time. When an additive present on the resin surfaces is not sufficiently fixed to the surfaces, the additives in the resin surfaces transfer to each other, and the surface conditions may be significantly changed.

If the ethylene bis-stearic acid amide is fixed to the surfaces, the ethylene bis-stearic acid amide does not transfer to the surface to be positioned on the outer surface of the container after the formation thereof. Therefore, the surface free energy of the surface to be positioned on the outer surface of a container after the formation thereof can be maintained in the range specified in the present invention.

Each of the resin layers used in the present invention is preferably a multilayer. Of course, in the case of a multilayer structure, it is necessary that the surface of the polyester resin layer as the upper layer in contact with contents has an interfacial free energy with water of 30 mN/m or more.

In the polyester rein layers of the multilayer structure, at least the polyester resin layer as the upper layer preferably has a softening point of 130° C. or more according to JIS K2425. The retort sterilization treatment for food cans requires 1 hour or more at a high temperature of 120° C. or more, and thus the resin layers preferably have heat resistance at over 120° C. The glass transition temperature is preferably 30° C. or more. This is because in storage and transport of the resin-coated metal sheet, the sheet may be held at a temperature of about 30° C. for a long time.

The polyester resin is represented by polyethylene terephthalate composed of terephthalic acid as a carboxylic acid component and ethylene glycol as a glycol component. However, a copolymer resin may be used, in which the components of polyethylene terephthalate are partially substituted by another carboxylic acid component such as isophthalic acid, phthalic acid, naphthalenedicarboxylic acid, or adipic acid, and another glycol component such as diethylene glycol, propylene glycol, butanediol, or neopentyl glycol.

The weight-average molecular weight of the polyester resin of the present invention is preferably 5,000 to 40,000 and particularly preferably 10,000 to 30,000. As the acid component of a copolymer, isophthalic acid is preferred because of its high transparency and tear strength and excellent safety. In particular, a polyethylene terephthalate copolymer copolymerized with isophthalic acid at a ratio of 22 mol % or less is particularly preferred. When the degree of copolymerization of isophthalic acid is 22 mol or less, the heat resistance of the resin layers can be easily maintained, and thus the copolymer is advantageous in heating for retort treatment.

The thickness of the polyester resin layers of the present invention is preferably 2 μm to 100 μm, more preferably 8 μm to 50 μm, and particularly preferably 10 μm to 25 μm. In the multilayer structure, the thickness of the polyester resin layer as the upper layer is preferably in the range of 0.5 μm to 5.0 μm and more preferably 0.5 μm to 1.5 μm.

In the present invention, the surface of the resin layer to be positioned on the outer surface of a container formed from the resin-coated metal sheet preferably has a surface free energy of 25 mN/m or more. This is because since a trade name or trademark is generally printed on the outer surface of a container, the outer surface preferably has higher ink wettability. As the resin layer having such a surface free energy value, a resin composed of polyester as a main component can be used. The resin composed of polyester as a main component is a resin containing 50 mass % or more of polyester. Examples of the resin other than the polyester include polyolefins.

Further, in the present invention, when a color pigment is added to the resin layer composed of polyester as a main component and to be positioned on the outer surface of a container, the metal sheet used as a base can be shielded, thereby imparting various color tones peculiar to the resin. For example, the metallic luster of the base can be shielded by adding a white pigment, and a printed surface can be make clear, thereby obtaining a good appearance.

The pigment added can preferably exhibit an excellent graphical design function after the formation of a container. From this viewpoint, an inorganic pigment such as titanium dioxide and an organic pigment such as isoindolinone can be used. These pigments have high tinting strength and are rich in ductility, and are thus preferred because the excellent graphical design function can be secured after the formation of a container.

In particular, for the resin layer to be positioned on the outer surface of a container after the formation thereof as specified in the present invention, titanium oxide is preferably used.

When each of the resin layers specified in the present invention has a multilayer structure, the pigment is added to at lease one layer and preferably added to the resin layer other than the uppermost layer.

Although the amount of the pigment added is not particularly specified, the amount is preferably in the range of less than 30 mass % because when the content in the resin layer is 30 mass % or more, generally, coverage is saturated to cause economic disadvantage. The amount of the pigment added is the ratio to the resin layer to which the pigment is added.

Next, the production method will be described.

The resin layer composed of polyester as the main component may be a non-oriented layer formed by, for example, a direct lamination method. However, the resin layer is preferably a biaxially stretched film laminated on the metal sheet because impact resistance and corrosion resistance are improved.

As the method for forming the multilayer structure, a plurality of resin layers is co-extruded and laminated directly on the metal sheet by the direct lamination method, or a polyester film with a multilayer structure may be fused to the metal sheet.

Examples of a method of adding a fatty acid amide to the polyester resin include a method in which a fatty acid amide is added to the polyester rein in a melt state, and the resulting mixture is kneaded in an extruder and then melt-extruded to form a resin film on the metal sheet, and a method in which a coating solution containing a fatty acid amide is applied during or after the formation of a polyester film to form a polyester resin layer containing a fatty acid amide as the uppermost layer. In view of the object of application of the present invention, the latter method is preferred.

In particular, a method of applying the coating solution during or after the formation of a biaxially stretched polyester film and then drying the coating solution by heating to form a coating film is preferred. When the coating solution is applied during the formation of the film, the coating solution is preferably applied immediately after drum casting or immediately after longitudinal stretching after drum casting. Also, the coating solution is preferably applied to the biaxially stretched polyester film by gravure roll coating, and the preferred conditions for drying after the coating solution is applied include 80° C. to 170° C. and 20 to 180 seconds and particularly 80° C. to 120° C. and 60 to 120 seconds.

Next, the method of laminating the film on the metal sheet by a heat fusion method to produce the resin-coated metal sheet will be described. For example, the present invention can use a method of heating the metal sheet to a temperature higher than the melting point of the film and then contact-fusing resin films to both surfaces of the metal sheet using a pressure bonding roll (also referred to as a "lamination roll" hereinafter).

The lamination conditions are appropriately determined so as to obtain the resin layers specified in the present invention. For example, it is preferred that the temperature of the metal sheet at the start of lamination is at least the melting point of the films, and the contact time of the films at the melting point thereof during lamination is in the range of 1 to 10 msec. In order to achieve the temperature and contact time, lamination at a high speed and cooling during bonding are required.

The pressure for lamination is not particularly specified, but the surface pressure is preferably 9.8 to 294 N/cm$^2$ (1 to 30 kgf/cm$^2$). The surface pressure of 9.8 N/cm$^2$ or more permits the achievement of sufficient adhesiveness. The surface pressure of 294 N/m$^2$ or less allows the equipment used to have low strength and is thus economical.

Example 1

An example of the present invention will be described below.

A cold-rolled steel sheet having a thickness of 0.18 mm and a width of 977 mm was annealed, temper-rolled, degreased, pickled, an then plated with chromium to produce a chromium-plated steel sheet (TFS). The chromium plating was performed in a chromium plating bath containing $CrO_3$, $F^-$, and $SO_4^{2-}$, followed by intermediate rinsing and then electrolysis with a chemical conversion solution containing $CrO_3$ and $F^-$. In this treatment, the electrolytic conditions (current density, electric quantity, etc.) were controlled to control the deposits of chromium metal and chromium hydroxide to 120 mg/m$^2$ and 15 mg/m$^2$, respectively, in terms of Cr.

Next, the chromium-plated steel sheet 1 was heated with a metal band heating device 2 using a metal band laminator 2 shown in FIG. 1. Then, each of the various resins 4a shown in Tables 1-1 and 1-2 was laminated (fused) on one of the surfaces of the chromium-plated steel sheet 1 using a lamination roll 3 to form a resin layer to be positioned on the inner surface of a container after the formation thereof. Further, each of the various resins 4b shown in Tables 2-1 and 2-2 was laminated (fused) on the other surface of the chromium-plated steel sheet 1 to form a resin layer to be positioned on the outer surface of a container after the formation thereof. Then, the metal sheet was cooled with water in a metal band cooling device 5 to produce a resin-coated metal sheet.

The lamination roll 3 was an internal water-cooling type in which cooling water was forcedly circulated during lamination. In laminating the resin films on the metal sheet, the time during which the film temperature at the interface with the metal sheet was higher than the melting point of the films was within the range of 1 to 20 msec.

Now, the method of producing the films is described. A polyester resin produced by copolymerizing ethylene glycol as a diol component and terephthalic acid and/or isophthalic acid as a dicarboxylic acid component at each of the ratios shown in Tables 1-1, 1-2, 2-1, and 2-2 was dried, melted, extruded, and then solidified by cooling on a cooling drum to prepare an unstretched film. Then, the unstretched was biaxially stretched and heat-fixed to prepare a biaxially stretched polyester film.

Then, the resulting resin composed of polyester resin as a main component, a fatty acid amide, and other additives at each of the weight ratios shown in Tables 1-1, 1-2, 2-1, and 2-2 were added to a mixed solvent containing toluene and methyl ethyl ketone to prepare a coating solution. The resulting coating solution was applied, with a roll coater, on one of the surfaces of the polyester to be positioned on the inner surface of a container after the formation thereof, and then dried. In this step, the thickness of the resin layer after drying was also controlled. The drying temperature was in the range of 80° C. to 120° C.

The characteristics of the resin-coated metal sheet and the resin layer formed on the metal sheet produced by the above-described method were measured and evaluated by the following methods (1) to (6). The obtained results are shown in Table 4.

(1) Interfacial Free Energy with Water

When a liquid is added dropwise on the resin surface to be positioned on the inner surface of a container formed from the resin-coated metal sheet, the following relation is satisfied:

$$\gamma l(1+\cos\theta)/2*(\gamma l^h)^{1/2} = (\gamma s^d)^{1/2}*(\gamma l^d)^{1/2}/(\gamma l^h)^{1/2}+(\gamma s^h)^{1/2}$$

wherein $\theta$ is the contact angle, $\gamma s^d$ is the dispersion force component of surface free energy of the inner surface resin, $\gamma s^h$ is the polar component thereof, $\gamma l$ is the surface free energy of the liquid, $\gamma l^d$ is the dispersion force component of surface free energy of the liquid, and $\gamma l^h$ is the polar component thereof.

The static contact angle of water with the resin layer surface was determined (humidity: 55 to 65%, temperature 20° C.) before and after retort treatment (130° C., 90 minutes) using five liquids (water, glycerol, formamide, ethylene glycol, and diethylene glycol) with the known surface free energies (known $\gamma l$, $\gamma l^h$, and $\gamma l^d$) and a contact angle meter (Kyowa Interface Science Co., Ltd. CA-D model).

The contact angle measured for each of the five liquids and $\gamma l$, $\gamma l^h$, and $\gamma l^d$ of each liquid were substituted into the above relational equation to determine $\gamma s^d$, and $\gamma s^h$, and $\gamma s$ by a least-square method.

Then, the interfacial free energy $\gamma^{IW}$ with water of the resin layer surface is determined by the following relational equation:

$$\gamma^{IW} = \gamma s + \gamma w - 2*(\gamma s^d * \gamma w^d) - 2*(\gamma s^h * \gamma w^h)$$

wherein $\gamma w$, $\gamma w^h$, and $\gamma w^d$ are surface free energies of water.

The resin-coated metal sheet was measured in a state immediately before filling of contents. For example, in application to a printed can, after a container was formed after printing and then heat treatment, a flat portion suitable for measurement, such as the container bottom, was subjected to measurement. The values of surface free energies of the five liquids used in measurement are shown in Table 3.

(2) Surface Free Energy

When a liquid is added dropwise on the resin surface to be positioned on the outer surface of a container formed from the resin-coated metal sheet, the following relation is satisfied:

$$\gamma l(1+\cos\theta)/2*(\gamma l^h)^{1/2} = (\gamma s^d)^{1/2}*(\gamma l^d)^{1/2}/(\gamma l^h)^{1/2}+(\gamma s^h)^{1/2}$$

wherein $\theta$ is the contact angle, $\gamma s^d$ is the dispersion force component of surface free energy of the outer surface resin, $\gamma s^h$ is the polar component thereof, $\gamma l$ is the surface free energy of the liquid, $\gamma l^d$ is the dispersion force component of surface free energy of the liquid, and $\gamma l^h$ is the polar component thereof.

The static contact angle of water with the resin layer surface was determined (humidity: 55 to 65%, temperature 20° C.) before and after retort treatment (130° C., 90 minutes) using five liquids (water, glycerol, formamide, ethylene glycol, and diethylene glycol) with the known surface free energies (known $\gamma l$, $\gamma l^h$, and $\gamma l^d$) and a contact angle meter (Kyowa Interface Science Co., ltd. CA-D model).

The contact angle $\theta$ measured for each of the five liquids and $\gamma l$, $\gamma l^h$, and $\gamma l^d$ of each liquid were substituted into the above relational equation to determine $\gamma s^d$ and $\gamma s^h$ by a least-square method and calculate $\gamma s$ ($=\gamma s^d + \gamma s^h$).

(3) Content Release Property

The laminated metal sheet was formed into a cup with a blank diameter of 100 mm and a drawing ratio (diameter before forming/diameter after forming) of 1.88 using a draw forming machine. Then, the cup was filled with cured meat for luncheon meat (protein ratio in solid: 50% or more), and a cover was seamed, followed by retort treatment (130° C., 90 minutes). Then, the cover was removed, and the contents were removed by reversing the cup to observe the degree of the contents remaining in the cup and evaluate the ease of release of the contents.

(Mark)

○: The contents can be removed by simply reversing the cup (without shaking with the hand), and substantially no adhesion is observed with the eyes on the inner surface of the cup after the content removal.

Δ: Although the contents remain in the cup when the cup is simply reversed, the contents can be removed by shaking the cup (shaking with the hand), and substantially no adhesion is observed with the eyes on the inner surface of the cup after the content removal.

x: The contents cannot be easily removed only by shaking the cup vertically (shaking with the hand), and the adhesion is clearly observed with the eyes on the inner surface of the cup after the contents are forcedly removed by extremely rapidly shaking the cup or the contents are forcedly removed using a tool such as a spoon or the like.

(4) Formability

After wax was applied on the coated metal sheet, a disk of 179 mm in diameter was cut out from the metal sheet and formed into a can by shallow drawing with a drawing ratio of 1.80. Then, the shallow-drawn can was again drawn at a drawing ratio of 2.20. Then, the can was domed, trimmed, and then neck-in-flanged to form a deep-drawn can. The neck-in portion of the resulting deep-drawn can was observed to visually observe the degree of damage to the film.

(Mark)

○: No damage is observed in the film after can forming.

Δ: A can be formed, but damage is observed in a portion of the film.

x: A can cannot be formed due to body breakage.

(5) Transfer Property (Stability of Surface Free Energy)

The resin surface to be positioned on the inner surface of a container formed from the resin-coated metal sheet and the resin surface to be positioned on the outer surface of a container formed from the resin-coated metal sheet were brought into contact with each other and allowed to stand with a load of 100 kg/cm² applied thereto for 1 week in a test atmosphere kept at 50° C. Then, the surface free energy of the resin surface to be positioned on the outer surface of a container formed from the resin-coated metal sheet was measured, and a difference from the surface free energy before the test was determined (humidity: 55 to 65%, temperature 20° C.).

(Mark)

○: The difference in surface free energy is less than 5 mN/m.

Δ: The difference in surface free energy is 5 mN/m to less than 10 mN/m.

x: The difference in surface free energy is 10 mN/m or more.

(6) Printability

After the resin-coated metal sheet was formed in a container, and printing ink (Toyo Ink, printing ink CCST39) was applied on the resin surface on the outer surface of the container and then dried so that the coating thickness was 1.5 μm.

Then, an adhesive tape manufactured by Nichiban Co., Ltd. was bonded to the coated surface and then peeled quickly. The test was carried out for ten sheets to examine the number of test sheets from which the ink was removed together with the tape.

○: 0

Δ: 1 to 3 x: 4 or more

Table 4 indicates that examples of the present invention are excellent in content release property and the other properties. However, comparative examples are inferior in any of the properties.

Therefore, according to the present invention, it is possible to obtain a resin-coated metal sheet for cans suitable for application to cans for contents with a high protein content, such as luncheon meat and tuna.

TABLE 1-1

| | Resin layer applied to inner surface of container | | | | | |
|---|---|---|---|---|---|---|
| | Upper resin layer | | | Lower resin layer | | |
| | Resin type | | Thickness | Resin type | | Thickness |
| No. | Acid component* | Glycol component* | (μm) | Acid component* | Glycol component* | (μm) |
| Invention Example 1 | Terephthalic acid (100) | Ethylene glycol (100) | 1.0 | Terephthalic acid (90) Isophthalic acid (10) | Ethylene glycol (100) | 15.0 |
| Invention Example 2 | Terephthalic acid (100) | Ethylene glycol (100) | 1.0 | Terephthalic acid (88) Isophthalic acid (12) | Ethylene glycol (100) | 15.0 |
| Invention Example 3 | Terephthalic acid (80) Isophthalic acid (20) | Ethylene glycol (40) Propanediol (60) | 1.0 | Terephthalic acid (88) Isophthalic acid (12) | Ethylene glycol (100) | 15.0 |
| Invention Example 4 | Terephthalic acid (80) Isophthalic acid (20) | Ethylene glycol (40) Propanediol (60) | 1.0 | Terephthalic acid (88) Isophthalic acid (12) | Ethylene glycol (100) | 15.0 |
| Invention Example 5 | Terephthalic acid (80) Isophthalic acid (20) | Ethylene glycol (40) Propanediol (60) | 1.0 | Terephthalic acid (88) Isophthalic acid (12) | Ethylene glycol (100) | 15.0 |
| Invention Example 6 | Terephthalic acid (80) Isophthalic acid (20) | Ethylene glycol (40) Propanediol (60) | 1.0 | Terephthalic acid (88) Isophthalic acid (12) | Ethylene glycol (100) | 15.0 |
| Invention Example 7 | Terephthalic acid (80) Isophthalic acid (20) | Ethylene glycol (40) Propanediol (60) | 1.0 | Terephthalic acid (88) Isophthalic acid (12) | Ethylene glycol (100) | 15.0 |
| Invention Example 8 | Terephthalic acid (80) Isophthalic acid (20) | Ethylene glycol (40) Propanediol (60) | 1.0 | Terephthalic acid (88) Isophthalic acid (12) | Ethylene glycol (100) | 15.0 |
| Invention Example 9 | Terephthalic acid (80) Isophthalic acid (20) | Ethylene glycol (40) Propanediol (60) | 1.5 | Terephthalic acid (88) Isophthalic acid (12) | Ethylene glycol (100) | 15.0 |
| Invention Example 10 | Terephthalic acid (80) Isophthalic acid (20) | Ethylene glycol (40) Propanediol (60) | 0.5 | Terephthalic acid (88) Isophthalic acid (12) | Ethylene glycol (100) | 15.0 |

| | Resin layer applied to inner surface of container | | | |
|---|---|---|---|---|
| | Additive | | | |
| No. | Layer to which additive was added | Compound name | Adding amount (mass %) | Interfacial free energy with water of resin layer surface (mN/m) |
| Invention Example 1 | Upper layer | Ethylene bis-stearic acid amide | 20.0 | 40 |
| Invention Example 2 | Upper layer | Ethylene bis-stearic acid amide | 10.0 | 37 |
| Invention Example 3 | Upper layer | Ethylene bis-stearic acid amide | 5.0 | 33 |
| Invention Example 4 | Upper layer | Ethylene bis-stearic acid amide | 0.5 | 30 |
| Invention Example 5 | Upper layer | Ethylene bis-stearic acid amide | 30.0 | 43 |
| Invention Example 6 | Upper layer | Ethylene bis-stearic acid amide | 40.0 | 45 |
| Invention Example 7 | Upper layer | Stearic acid amide | 20.0 | 32 |
| Invention Example 8 | Upper layer | Ethylene bis-stearic acid amide | 20.0 | 32 |
| Invention Example 9 | Upper layer | Ethylene bis-stearic acid amide | 20.0 | 41 |
| Invention Example 10 | Upper layer | Ethylene bis-stearic acid amide | 20.0 | 38 |

*A numeral in parentheses indicates a molar ratio (%).

TABLE 1-2

| | Resin layer applied to inner surface of container | | | | | |
|---|---|---|---|---|---|---|
| | Upper resin layer | | | Lower resin layer | | |
| | Resin type | | Thickness | Resin type | | Thickness |
| No. | Acid component* | Glycol component* | (μm) | Acid component* | Glycol component* | (μm) |
| Invention Example 11 | Terephthalic acid (80) Isophthalic acid (20) | Ethylene glycol (40) Diethylene glycol (10) Propanediol (50) | 1.0 | Terephthalic acid (88) Isophthalic acid (12) | Ethylene glycol (100) | 20.0 |

TABLE 1-2-continued

| No. | Acid component | Glycol component | Thickness (µm) | Acid component | Glycol component | Thickness (µm) |
|---|---|---|---|---|---|---|
| Invention Example 12 | Terephthalic acid (80) Isophthalic acid (20) | Ethylene gtycol (40) Propanediol (60) | 1.0 | Terephthalic acid (85) Isophthalic acid (15) | Ethylene glycol (95) Diethylene glycol (5) | 15.0 |
| Invention Example 13 | Terephthalic acid (100) | Ethylene glycol (100) | 1.0 | Terephthalic acid (100) | Ethylene glycol (100) | 15.0 |
| Invention Example 14 | Terephthalic acid (80) Isophthalic acid (20) | Ethylene glycol (40) Propanediol (60) | 2.0 | Terephthalic acid (100) | Ethylene glycol (100) | 15.0 |
| Comparative Example 1 | Terephthalic acid (100) | Ethylene glycol (100) | 1.0 | Terephthalic acid (90) Isophthalic acid (10) | Ethylene glycol (100) | 15.0 |
| Comparative Example 2 | Terephthalic acid (100) | Ethylene glycol (100) | 1.0 | Terephthalic acid (90) Isophthalic acid (10) | Ethylene glycol (100) | 15.0 |
| Comparative Example 3 | Terephthalic acid (100) | Ethylene glycol (100) | 1.0 | Terephthalic acid (90) Isophthalic acid (10) | Ethylene glycol (100) | 15.0 |
| Comparative Example 4 | Terephthalic acid (100) | Ethylene glycol (100) | 1.0 | Terephthalic acid (100) | Ethylene glycol (100) | 15.0 |
| Comparative Example 5 | Terephthalic acid (100) | Ethylene glycol (100) | 2.0 | Terephthalic acid (100) | Ethylene glycol (100) | 15.0 |

| | Resin layer applied to inner surface of container | | | |
|---|---|---|---|---|
| | Additive | | | |
| No. | Layer to which additive was added | Compound name | Adding amount (mass %) | Interfacial free energy with water of resin layer surface (mN/m) |
| Invention Example 11 | Upper layer | Ethylene bis-stearic acid amide | 20.0 | 40 |
| Invention Example 12 | Upper layer | Ethylene bis-stearic acid amide | 30.0 | 43 |
| Invention Example 13 | Upper layer | Ethylene bis-stearic acid amide | 20.0 | 40 |
| Invention Example 14 | Upper layer | Ethylene bis-stearic acid amide | 20.0 | 40 |
| Comparative Example 1 | Upper layer | Ethylene bis-stearic acid amide | 0.1 | 22 |
| Comparative Example 2 | Upper layer | Paraffin wax | 1.0 | 25 |
| Comparative Example 3 | — | — | — | 21 |
| Comparative Example 4 | Upper layer | Polypropylene wax | 2.0 | 26 |
| Comparative Example 5 | Upper layer | Polyethylene wax | 2.0 | 26 |

*A numeral in parentheses indicates a molar ratio (%).

TABLE 2-1

| | Resin layer applied to outer surface of container | | | | | |
|---|---|---|---|---|---|---|
| | Upper resin layer | | | Lower resin layer | | |
| | Resin type | | Thickness | Resin type | | Thickness |
| No. | Acid component* | Glycol component* | (µm) | Acid component* | Glycol component* | (µm) |
| Invention Example 1 | Terephthalic acid (100) | Ethylene glycol (100) | 5.0 | Terephthalic acid (90) Isophthalic acid (10) | Ethylene glycol (100) | 7.0 |
| Invention Example 2 | Terephthalic acid (88) Isophthalic acid (12) | Ethylene glycol (100) | 3.0 | Terephthalic acid (88) Isophthalic acid (12) | Ethylene glycol (100) | 10.0 |
| Invention Example 3 | Terephthalic acid (88) Isophthalic acid (12) | Ethylene glycol (100) | 3.0. | Terephthalic acid (88) Isophthalic acid (12) | Ethylene glycol (100) | 10.0 |
| Invention Example 4 | Terephthalic acid (88) Isophthalic acid (12) | Ethylene glycol (100) | 3.0 | Terephthalic acid (88) Isophthalic acid (12) | Ethylene glycol (100) | 10.0 |
| Invention Example 5 | Terephthalic acid (88) Isophthalic acid (12) | Ethylene glycol (100) | 3.0 | Terephthalic acid (88) Isophthalic acid (12) | Ethylene glycol (100) | 10.0 |
| Invention Example 6 | Terephthalic acid (88) Isophthalic acid (12) | Ethylene glycol (100) | 3.0 | Terephthalic acid (88) Isophthalic acid (12) | Ethylene glycol (100) | 10.0 |
| Invention Example 7 | Terephthalic acid (88) Isophthalic acid (12) | Ethylene glycol (100) | 3.0 | Terephthalic acid (88) Isophthalic acid (12) | Ethylene glycol (100) | 10.0 |
| Invention Example 8 | Terephthalic acid (88) Isophthalic acid (12) | Ethylene glycol (100) | 3.0 | Terephthalic acid (88) Isophthalic acid (12) | Ethylene glycol (100) | 10.0 |
| Invention Example 9 | Terephthalic acid (100) | Ethylene glycol (100) | 1.0 | Terephthalic acid (88) Isophthalic acid (12) | Ethylene glycol (100) | 11.0 |
| Invention Example 10 | Terephthalic acid (100) | Ethylene glycol (100) | 1.0 | Terephthalic acid (88) Isophthalic acid (12) | Ethylene glycol (100) | 11.0 |

TABLE 2-1-continued

| | Resin layer applied to outer surface of container | | | |
|---|---|---|---|---|
| | Additive | | | |
| No. | Layer to which additive was added | Compound name | Adding amount (mass%) | Surface free energy of resin layer surface (mN/m) |
| Invention Example 1 | Lower layer | Titanium dioxide | 20.0 | 35 |
| Invention Example 2 | Lower layer | Titanium dioxide | 20.0 | 35 |
| Invention Example 3 | Lower layer | Titanium dioxide | 10.0 | 35 |
| Invention Example 4 | Lower layer | Titanium dioxide | 15.0 | 34 |
| Invention Example 5 | Lower layer | Titanium dioxide | 5.0 | 36 |
| Invention Example 6 | Lower layer | — | — | 35 |
| Invention Example 7 | Lower layer | Iso-indolinone | 1.0 | 34 |
| Invention Example 8 | Lower layer | Iso-indolinone | 0.5 | 35 |
| Invention Example 9 | Lower layer | Titanium dioxide | 20.0 | 35 |
| Invention Example 10 | Lower layer | Titanium dioxide | 20.0 | 35 |

*A numeral in parentheses indicates a molar ratio (%).

TABLE 2-2

| | Resin layer applied to outer surface of container | | | | | |
|---|---|---|---|---|---|---|
| | Upper resin layer | | | Lower resin layer | | |
| | Resin type | | Thickness | Resin type | | Thickness |
| No. | Acid component* | Glycol component* | (μm) | Acid component* | Glycol component* | (μm) |
| Invention Example 11 | Terephthalic acid (88) Isophthalic acid (12) | Ethylene glycol (100) | 3.0 | Terephthalic acid (88) Isophthalic acid (12) | Ethylene glycol (100) | 10.0 |
| Invention Example 12 | Terephthalic acid (85) Isophthalic acid (15) | Ethylene glycol (100) | 3.0 | Terephthalic acid (88) Isophthalic acid (15) | Ethylene glycol (100) | 10.0 |
| Invention Example 13 | Terephthalic acid (100) | Ethylene glycol (100) | 5.0 | Terephthalic acid (100) | Ethylene glycol (100) | 8.0 |
| Invention Example 14 | Terephthalic acid (100) | Ethylene glycol (100) | 3.0 | Terephthalic acid (100) | Ethylene glycol (100) | 10.0 |
| Comparative Example 1 | Terephthalic acid (90) Isophthalic acid (10) | Ethylene glycol (100) | 2.0 | Terephthalic acid (90) Isophthalic acid (10) | Ethylene glycol (100) | 10.0 |
| Comparative Example 2 | Terephthalic acid (90) Isophthalic acid (10) | Ethylene glycol (100) | 2.0 | Terephthalic acid (90) Isophthalic acid (10) | Ethylene glycol (100) | 10.0 |
| Comparative Example 3 | Terephthalic acid (90) Isophthalic acid (10) | Ethylene glycol (100) | 2.0 | Terephthalic acid (90) Isophthalic acid (10) | Ethylene glycol (100) | 10.0 |
| Comparative Example 4 | Terephthalic acid (100) | Ethylene glycol (100) | 3.0 | Terephthalic acid (100) | Ethylene glycol (100) | 9.0 |
| Comparative Example 5 | Terephthalic acid (100) | Ethylene glycol (100) | 9.0 | Terephthalic acid (100) | Ethylene glycol (100) | 3.0 |

| | Resin layer applied to outer surface of container | | | |
|---|---|---|---|---|
| | Additive | | | |
| No. | Layer to which additive was added | Compound name | Adding amount (mass%) | Surface free energy of resin layer surface (mN/m) |
| Invention Example 11 | Lower layer | Titanium dioxide | 20.0 | 35 |
| Invention Example 12 | Lower layer | Titanium dioxide | 20.0 | 35 |
| Invention Example 13 | Lower layer | Iso-indolinone | 0.8 | 35 |
| Invention Example 14 | Lower layer | Titanium dioxide | 15.0 | 35 |

TABLE 2-2-continued

| | | | | |
|---|---|---|---|---|
| Comparative Example 1 | Upper layer | Ethylene bis-stearic acid amide | 20.0 | 18 |
| Comparative Example 2 | Upper layer | Titanium dioxide | 20.0 | 35 |
| Comparative Example 3 | Upper layer | Titanium dioxide | 20.0 | 35 |
| Comparative Example 4 | — | — | — | 35 |
| Comparative Example 5 | — | — | — | 35 |

*A numeral in parentheses indicates a molar ratio (%).

TABLE 3

| | $\gamma ld$ (mN/m) | $\gamma lh$ (mN/m) | $\gamma l$ (mN/m) |
|---|---|---|---|
| Water | 21.5 | 50.3 | 71.8 |
| Glycerol | 34.0 | 30.0 | 64.0 |
| Formamide | 39.5 | 18.7 | 58.2 |
| Ethylene glycol | 32.8 | 15.2 | 48.0 |
| Diethylene glycol | 38.1 | 6.7 | 44.8 |

TABLE 4

| No. | Content release property | Form-ability | Transfer property | Print-ability |
|---|---|---|---|---|
| Invention Example 1 | ○ | ○ | ○ | ○ |
| Invention Example 2 | ○ | ○ | ○ | ○ |
| Invention Example 3 | ○ | ○ | ○ | ○ |
| Invention Example 4 | Δ | ○ | ○ | ○ |
| Invention Example 5 | ○ | ○ | ○ | ○ |
| Invention Example 6 | ○ | ○ | Δ | ○ |
| Invention Example 7 | Δ | ○ | ○ | ○ |
| Invention Example 8 | Δ | ○ | ○ | ○ |
| Invention Example 9 | ○ | ○ | ○ | ○ |
| Invention Example 10 | ○ | ○ | ○ | ○ |
| Invention Example 11 | ○ | ○ | ○ | ○ |
| Invention Example 12 | ○ | ○ | ○ | ○ |
| Invention Example 13 | ○ | Δ | ○ | ○ |
| Invention Example 14 | ○ | Δ | ○ | ○ |
| Comparative Example 1 | x | ○ | ○ | x |
| Comparative Example 2 | x | ○ | x | ○ |
| Comparative Example 3 | x | ○ | ○ | ○ |
| Comparative Example 4 | x | x | x | ○ |
| Comparative Example 5 | x | x | x | ○ |

INDUSTRIAL APPLICABILITY

Since a container formed from the resin-coated metal sheet of the present invention has the excellent content release property, consumer eagerness to buy is not impaired. Therefore, the resin-coated steel sheet is suitable for application to cans and packages.

The invention claimed is:

1. A container which contains contents therein, the container being formed from a resin-coated metal sheet, said resin-coated metal sheet comprising resin layers formed on both surfaces thereof, the resin layers comprising a first polyester as a main component and a fatty acid amide, wherein a resin layer covering an inner surface of the container has an interfacial free energy with water of 30 mN/m or more, wherein said contents contain fat and an oil film is formed at an interface between said resin layer covering the inner surface of the container and said contents.

2. The container according to claim 1, wherein the resin covering the outer surface of a container after the formation thereof has a surface free energy of 25 mN/m or more.

3. The container according to claim 1, further comprising a second polyester resin layer formed between the metal sheet and each of the resin layers composed of the first polyester as the main component.

4. The container according to claim 3, wherein the resin covering the outer surface of a container after the formation thereof has a surface free energy of 25 mN/m or more.

5. The container according to claim 1, wherein the fatty acid amide is contained in an amount of 0.5 to 40 mass %.

6. The container according to claim 5, wherein the resin covering the outer surface of a container after the formation thereof has a surface free energy of 25 mN/m or more.

7. The container according to claim 5, wherein the fatty acid amide is ethylene bis-stearic acid amide.

8. The container according to claim 7, wherein the resin covering the outer surface of a container after the formation thereof has a surface free energy of 25 mN/m or more.

* * * * *